C. F. BURGESS.
METHOD AND APPARATUS FOR STERILIZING.
APPLICATION FILED OCT. 30, 1913.
1,200,165. Patented Oct. 3, 1916.
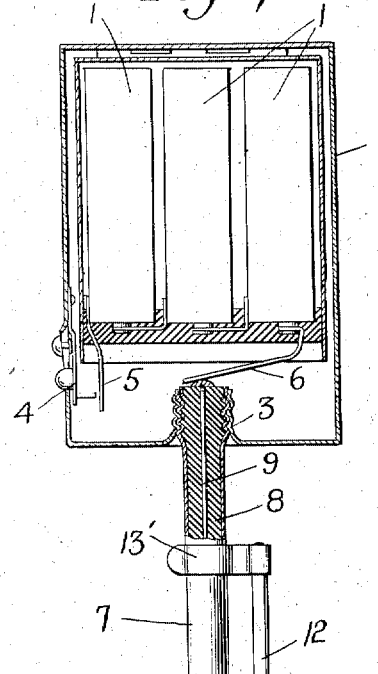
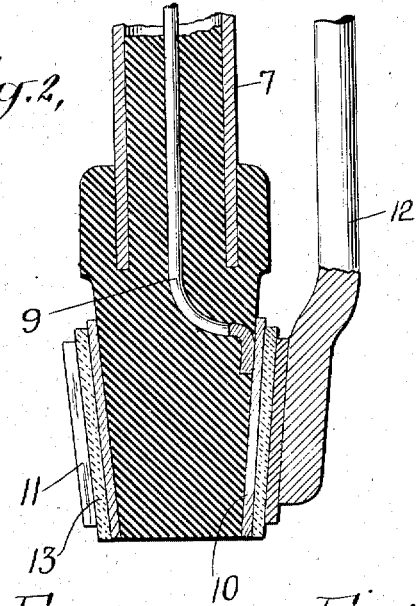
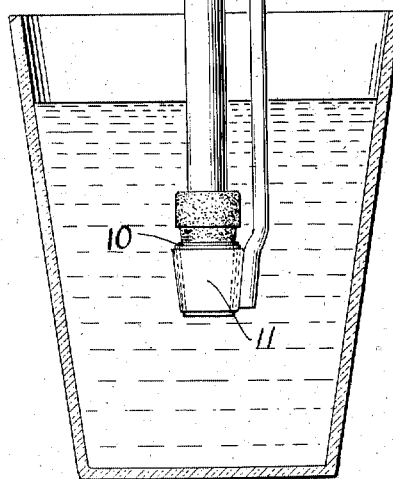
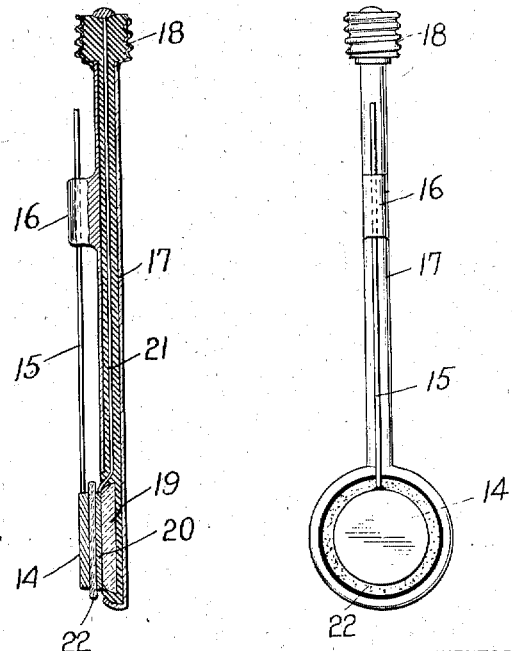
WITNESSES
C. B. Schroeder
L. Bates
INVENTOR
Charles F. Burgess
BY
Arba B. Marvin
ATTORNEY

UNITED STATES PATENT OFFICE.

CHARLES F. BURGESS, OF MADISON, WISCONSIN.

METHOD AND APPARATUS FOR STERILIZING.

1,200,165.        Specification of Letters Patent.      Patented Oct. 3, 1916.

Application filed October 30, 1913. Serial No. 798,177.

*To all whom it may concern:*

Be it known that I, CHARLES F. BURGESS, a citizen of the United States, residing in the city of Madison, county of Dane, and State of Wisconsin, have invented certain new and useful Improvements in Methods and Apparatus for Sterilizing; and I do hereby declare the following to be a full, clear, and exact description of the invention, such as will enable others skilled in the art to which it appertains to make and use the same.

My present invention relates to the treatment of liquids by electrolytic action as typified by the purification of water for drinking purposes and more particularly is directed to the treatment of water in small quantities to free it from typhoid and other dangerous disease germs and bacteria.

It is an object of the present invention to provide a method and apparatus which is available for instant use by travelers, campers, soldiers and other individuals for the quick treatment of water and other potable liquids, the purity of which is questionable, so that the danger of drinking them may be minimized or completely obviated and recourse need not be had to filtering, boiling and similar precautionary methods now common. The invention is also of use to dentists, surgeons, and in sterilizing operations generally.

The apparatus of my invention is distinctly portable in character, as illustrated by the fact that a complete equipment for treating or sterilizing as much as 8000 liters of water need not weigh more than a few ounces and may conveniently be carried in a coat pocket.

Ordinarily, the apparatus is used on a small quantity of water at a time, say a cupful, but the apparatus may be used again and again with but slight readjustments, and with certainty and reliability in its action.

Various details of the method and of the apparatus may be changed in many ways, but in the embodiments hereinafter disclosed in detail, the apparatus includes a battery of suitable voltage, preferably of a size to be conveniently carried in the hand or pocket, and a pair of electrodes so constructed and connected that they may be used for the electrolytic production of the sterilizing or purifying agent whenever and as it is needed for the treatment of the water. Additional adjuncts are provided for bringing about this electrolytic action including means for providing in immediate proximity to the electrodes a conductive solution or electrolyte capable, under the action of the current from the batteries, of liberating elements or compounds which, by appropriate chemical action and re-action ultimately yield an oxidizing agent the effect of which is to destroy the dangerous germs or bacteria and to render the water sterile and safe for drinking. The water thus treated retains its original occluded or dissolved gases and is not flat or otherwise unpalatable, and is altogether wholesome and ready for immediate consumption.

If sodium chlorid or common salt is used for establishing a suitably constituted electrolyte between the electrodes, as it may be, the electrolytic action will yield sodium hypochlorite ($NaOCl$) and thus make available this remarkable oxidizing or sterilizing agent. An explanation of the action of sodium hypochlorite is that in the presence of water it yields nascent or active oxygen which by oxidation will destroy the organic substances carried by the water. Because of the fact that the electrolytic products are in nascent condition they have their maximum activity and are thus extremely efficacious in destroying bacteria and bacilli.

All of the necessary electrolysis may be effected without using in the water under treatment more than a very small quantity of sodium chlorid or common salt, for by adding the salt in the immediate neighborhood of the electrodes, as hereinafter explained, the necessary local conductivity is obtained while the main body of water is practically unsalted and to all practical purposes non-conductive. As soon as electrolysis begins, the products formed thereby begin to diffuse throughout the entire body of water under treatment. This diffusion is accelerated by the bubbles of gas evolved at the electrodes which in themselves produce a stirring action, and within a very short time, all parts of the water will have been subjected to the purifying oxidation and all dangerous bacteria and bacilli will have been destroyed. Although the action is very rapid always, it can be further accelerated by additional stirring, as by manually moving the electrodes about in the body of water.

Various forms of electrodes may be used and various expedients may be resorted to for introducing the salt into the water in the immediate neighborhood of the electrodes and various salts other than sodium chlorid may be used, and I do not desire to be limited in these particulars, for such changes and variations are contemplated by me and are intended to be embraced by the appended claims.

In the accompanying drawings, Figure 1 is an elevation partly in section showing one embodiment of my invention ready for treating a small quantity of water; Fig. 2 is a sectional elevation of the conical electrodes and the bibulous material which separates them; Fig. 3 is a sectional elevation of a modified form of apparatus; and Fig. 4 is a front elevation of the same.

The drawings show one operative embodiment of my invention which embodiment may, however, as I am well aware, be changed in many particulars and still retain the characteristic features which render my invention particularly suited to the quick production of sterilized water in small quantities.

In the embodiment illustrated in the drawings, the apparatus comprises a battery element which may consist of a plurality of dry cells 1 connected in series and inclosed within a suitable container 2 of a type commonly used with battery hand lamps. By using three cells in series, as shown in the drawing, the effective voltage available for electrolysis is suitable. At one end of this container is a screw-threaded socket 3 of metal in electrical connection with the metal container 2. A spring contact maker 4 at the side of the container cooperates with a brass strip 5 soldered to the zinc or negative terminal of one of the dry cells to establish connection between the series of cells and the threaded socket 3. This contact maker is normally open, but can be closed when current is to be passed between the electrodes. The other terminal of the series of cells is provided with a spring strip terminal 6 which registers with the opening in socket 3 and is in position to contact with the terminal of a socket screw-threaded therein.

The sterilizing electrodes may be of various shapes and sizes and of many different materials, and may be connected to the battery element in ways other than that here disclosed, though the present construction is compact and will serve as an illustrative embodiment of the invention.

The electrodes themselves may be both of platinum, or the anode may be of platinum or other inert material having metallic conductivity, and the cathode may be of silver, nickel, or nickel-plated iron or brass, or in fact any metal not acted upon by any of the cathodic products of electrolysis.

In the construction illustrated, two electrodes are carried on the end of a rigid support 7, which may be termed a handle, whereby the electrodes may be inserted into the water and moved about therein. The outer part of this support is a metal tube or shell with one end screw-threaded for reception into the threaded socket 3. Within this metal tube is a filling 8 of glass, hard rubber, or the like, through the center of which runs a conductor 9 used for establishing electrical connection with the anode. The wire protrudes through the glass, or hard rubber at the upper end of the support for contact with the spring terminal 6. At the lower end of the support, the glass, or hard rubber, projects below the metal tube as a conical enlargement, and to it is rigidly attached the anode 10 of the cell. In the construction shown, the anode 10 is of platinum in the form of a truncated cone, and is permanently attached to the lower end of conductor 9.

The cathode 11 here illustrated is of nickel-plated brass and is of conical shape with a slit to give it yielding flexibility and may be perforated if desired to permit the more ready diffusion of the products of electrolysis. It is mounted on a nickel support bar 12 which carries at the other end a spring clip 13' movable freely along the metal tube 7, and serving to establish electrical connection therewith.

The term "electrolytic cell", as herein used, should be understood to mean two electrodes and an intervening electrolyte. In the use of the apparatus here disclosed, means is provided for establishing the electrolyte between the electrodes when current is to be passed between them, but this need not be done until after the electrodes have been introduced into the body of liquid to be sterilized, and can be done conveniently by initially providing between the electrodes a bibulous material such as paper containing a suitable soluble salt so that on introduction of the electrodes into the water to be sterilized, the water penetrates the bibulous material forming a conductive salt solution in the immediate neighborhood of the electrodes and without imparting to the main body of water a sufficient quantity of salt to render it practically conductive or salty to the taste. The electrolytic cell thus made complete by the addition of the small amount of water necessary to dissolve the salt, is the agency whereby under the action of the current, the sterilizing materials are produced and from which these sterilizing materials may diffuse throughout the entire body of water to be sterilized.

Ordinary drinking water is substantially non-conductive for current of the low potentials here involved, and according to the method herein disclosed, the main body of water to be sterilized remains substantially non-conductive at all times and does not carry current, and participates in the electro-chemical action only to the extent of absorbing from the cell the sterilizing agencies as they are produced in nascent condition by the passage of current through the cell.

The bibulous element 13 which is interposed between the anode and the cathode, and serves as a means for introducing between them the requisite salt solution, also serves to hold the electrodes out of metallic contact with one another and at a proper distance apart. It also serves as a medium wherein the products of electrolysis may react and recombine to yield as their final product the sterilizing agencies here contemplated, holding the several elements and compounds only to the extent necessary for the production of the desired re-actions and then liberating the ultimate products into the surrounding body of water where the sterilizing effect is to be produced.

The bibulous material may be ordinary filter paper which has been impregnated with an appropriate salt solution, say sodium chlorid solution, and then dried, and may be shaped to the form of a truncated cone to slip over the conical anode 10, or, if desired, may be in the form of a flat, straight strip, which can be wound about the conical anode.

Although I now consider sodium chlorid the most satisfactory salt for this purpose, because of the ease with which it may be obtained by anyone using the apparatus, I am aware that other chlorids could be used, as calcium chlorid or potassium chlorid, and it is even possible to use the corresponding bromids and iodids. As to the quantity of salt which the bibulous material should carry, this can be varied through wide limits, and also can be used as a means for automatically regulating the quantity of sterilizing agents liberated in a body of water.

By putting in the bibulous material a very small quantity of salt, the electrolyte formed therefrom can be so completely used up through electrolytic decomposition and through diffusion into the surrounding water that the resistance to the flow of current between the electrodes will become high and the flow of current will thereby be substantially stopped. In addition to the decomposition of the salt solution, there is of course some diffusion of it outward into the surrounding unsalted body of water, and some of it is mechanically carried away by the hydrogen bubbles which come out vigorously when the cell is in action, and are to a measure relied on to distribute the hypochlorite or other sterilizing agent throughout the body of water. Even though the bibulous material may carry salt far in excess of that necessary for complete sterilization of the body of water, there will not be enough salt present to give to the water as a whole a salty taste.

As the bibulous material, there may be used in place of filter paper other materials, such as asbestos, cloth, gelatin, and the like.

In the modification illustrated in Figs. 3 and 4, the cathode 14 is of nickel carried on the end of a resilient conductor 15 slidingly mounted in a socket 16, which is positioned on the side of the support tube 17, to which the terminal plug 18 is connected for insertion into the threaded socket of the battery. Tube 17 is of nickel and has its lower end spread out to a circular form for the reception of a glass plate 19 held in place by cement and bearing on its exposed surface the platinum anode 20, which may be either in the form of a plate cemented in position, or a mere facing of platinum burned on according to ceramic methods or electro-plated on the glass by a known procedure. This platinum electrode is electrically connected with a conductor 21 which passes throughout the length of tube 17 and is insulated therefrom by a surrounding envelop of cement, or the like. In this modification, the bibulous material 22 is in the form of a round disk, and is yieldingly held between the two electrodes because of the resiliency of wire 15, and can be renewed by merely pulling the electrodes apart.

Assuming the apparatus assembled with switch 4 open and a dry cell bearing bibulous material between the two electrodes, the two electrodes are thrust into a body of water, say a tumbler full or a pail full, and the water soaking into the bibulous material forms the electrolyte from the salt and completes the electrolytic cell, and thereupon the contact maker 4 can be closed to start the flow of current through the electrolyte to bring about its decomposition. If sodium chlorid is being used, the anode product will be chlorin, and the cathode product will be sodium, which immediately reacts with the water to form sodium hydrate (NaOH), liberating hydrogen which escapes in the form of bubbles with vigorous agitation of the liquid being sterilized. The chlorin which is soluble in water, and very soluble in alkaline solution reacts with the sodium hydrate, forming sodium hypochlorite (NaOCl). Sodium hypochlorite is one of the most powerful sterilizing agents known, and even in the proportions of one part to a million when added to drinking water will render the water substantially sterile. In addition, it is harmless in itself even when present in many times the quantity necessary for complete sterilization, and may be considered even beneficial for consumption.

The efficacy of hypochlorites is recognized in the sterilization of city water supplies where the customary dosing of the water is on the basis of from four to twenty pounds of calcium hypochlorite per million gallons of water, though more than one hundred times this amount might be used without harm. While calcium hypochlorite is the agent commonly employed in city water treatment, sodium hypochlorite is even more effective as a sterilizing agent.

I have ascertained by bacteriological tests that the sterilizing effect of my method begins immediately, even with typhoid bacteria, and complete sterilization may be effected in a few seconds, though no harm will result from continuing the electrolyzing action for a much longer time. Complete sterilization takes place long before the water acquires an appreciable odor from the hypochlorite, so that by treating until the odor can be detected the operator may be sure that complete and absolute sterilization has been effected, though it is not necessary to carry the reaction that far, for the evolution of gas bubbles from the electrodes indicates the activity of the electrolytic process, and with brisk evolution of gas there is nothing to be gained by continuing the action for more than a fraction of a minute.

On the basis of four pounds of hypochlorite to a million gallons of water only .000265 grams of salt need be decomposed per liter of water sterilized, and the amount of current theoretically required to decompose the salt is .45 ampere seconds per liter of water, or assuming a current efficiency of 33%, is 1.35 ampere seconds per liter. A small size or vest pocket battery will furnish sufficient energy to sterilize over 1,000 liters, and the larger size of pocket batteries commonly used for flash lights will give enough current to sterilize 8,000 liters.

The method of my present invention may be carried out with apparatus varying greatly from that shown in the drawings, but the portability and efficacy of the constructions there disclosed render them particularly suited to the needs of travelers and soldiers, and offer a ready and satisfactory agency for the quick and certain sterilization of drinking water.

I claim:

1. An apparatus for producing sterilizing agents in a body of water, said apparatus comprising a battery, electrodes connected with the terminals and adapted for immersion in the water to be sterilized, and a bibulous material adjacent to said electrodes and containing a salt, said salt being effective to establish a local conductive path for current when the electrodes are introduced into a body of water to be sterilized.

2. In an apparatus for the sterilization of drinking water, the combination of a hand battery, electrodes connected to the terminals thereof, means for establishing an electrolytic path in the immediate neighborhood of said electrodes by the introduction of a suitable soluble chlorid, whereby on the passage of current from said battery through said electrolyte, a hypochlorite will be produced for diffusion throughout the body of water to be purified.

3. An apparatus for the treatment of potable liquids comprising a hand battery, electrodes connected with the terminals of said battery, and means for establishing a conductive path between said electrodes through a sodium chlorid solution while the main body of water remains substantially non-conductive and exposed to the sterilizing action of the hypochlorite produced when current flows through said sodium chlorid solution.

4. An apparatus for producing hypochlorite comprising a hand battery, electrodes connected with the terminals thereof and a bibulous material containing a salt, the parts being so arranged that when introduced into a body of water a current will flow locally between said electrodes, liberating hypochlorite, for the purification of said body of water.

5. In apparatus for sterilizing potable liquids, the combination of a source of current, a pair of electrodes, means for locally establishing an electrolyte of sodium chlorid solution in immediate proximity to said electrodes, without imparting to the main body of water a sufficient quantity of salt to render it practically conductive or salty to the taste, and allowing free distribution into the body of liquid under treatment of the sodium hypochlorite formed by the passage of current between said electrodes.

6. In an apparatus for the sterilization of drinking water, the combination of a hand battery having a socket and electrodes carried on a rigid support inserted into said socket, a bibulous material positioned between said electrodes and initially carrying sodium chlorid, said bibulous material and its salt being serviceable to establish an electrolytic path for current from said battery when said electrodes are introduced into a body of water to be purified.

7. In a water sterilizer, a pair of electrodes between which current may be passed for the electrolytic production of hypochlorite, said electrodes being mounted on a support shaped to form a handle whereby said electrodes may be inserted into a body of liquid and moved about while in action and means movable with said electrodes for forming a salt solution between said electrodes and out of which the hypochlorite may be formed by electrolysis.

8. In a water sterilizer, the combination of an electrode, a rigid support for said electrode, a second electrode, a bibulous material between said electrodes and resilient means yieldingly securing said last named electrode to said support.

9. In a water sterilizer, the combination of a pair of electrodes and a bibulous material adjacent thereto, a rigid support for one of said electrodes forming a handle whereby the electrodes may be moved about in the water under treatment, the other electrode being detachably secured to said support and removable therefrom when the bibulous material is to be renewed.

10. In an apparatus for sterilizing drinking water, the combination of electrodes for connection with a source of current, and a bibulous material containing salt and positioned adjacent to said electrodes to establish an electrolytic path therebetween when the electrodes are introduced into a body of water to be sterilized, the quantity of salt carried by said bibulous material being insufficient to render said body of water salty to the taste.

11. The process of treating an unsalted body of drinking water with a hypochlorite formed by the electrolysis of a salt solution, which consists in immersing directly into unsalted body an electrolytic cell having a salt water electrolyte, supplying current to said cell, and liberating into the surrounding and previously unsalted water the electrolytic products formed in said cell without using for the electrolyte enough salt to render the main body of water salty to the taste; substantially as described.

12. The process of sterilizing drinking water which consists in introducing therein a pair of electrodes in contact with a bibulous material carrying a suitable soluble substance, and passing current between said electrodes to liberate in said water and in nascent condition sterilizing agencies produced by the electrolyzing action of said current, said soluble substance being too small in quantity to render said body of water unsuited for drinking.

13. The process of sterilizing water by agencies electrolytically formed between two electrodes, which consists in establishing a suitable electrolyte between said electrodes while immersed in a body of water which is substantially non-conductive, and then electrolyzing said electrolyte and allowing the products thus formed to diffuse directly into the surrounding non-conductive water to sterilize the same without making it salty to the taste.

14. The process of sterilizing drinking water, which consists in introducing therein a pair of electrodes in contact with a bibulous material carrying a suitable salt, passing current between said electrodes to liberate in said water and in nascent condition sterilizing agencies produced by the electrolyzing action of said current, and facilitating diffusion of said agencies by movement of the electrodes within the body of water.

15. The process of sterilizing drinking water, which consists in introducing therein a pair of electrodes in contact with a bibulous material carrying a suitable salt, and passing current between said electrodes to liberate in said water and in nascent condition sterilizing agencies produced by the electrolyzing action of said current, the duration of the electrolyzing action being governed by the quantity of salt initially present in said bibulous material.

16. The process of sterilizing drinking water, by means of a pair of electrodes between which is interposed a dry, bibulous material containing sodium chlorid, which consists in introducing said electrodes and bibulous material into the liquid to be sterilized, thereby forming from said salt an electrolyte between said electrodes, passing current through said electrolyte and liberating into the surrounding and substantially non-conductive water the hypochlorite thus formed.

17. The process of sterilizing drinking water, by means of a pair of electrodes between which is interposed a dry, bibulous material containing sodium chlorid, which consists in introducing said electrodes and bibulous material into the liquid to be sterilized, thereby forming from said salt an electrolyte between said electrodes, passing current through said electrolyte and liberating into the surrounding and substantially non-conductive water the hypochlorite thus formed while stirring the water with the electrodes to facilitate the diffusion of the hypochlorite therethrough.

18. The process which consists in sterilizing a cup of water just preparatory to drinking without rendering said water salty to the taste which consists in locally electrolyzing in said cup with current between suitable electrodes in the presence of but a small quantity of unconfined sodium chlorid and allowing free access of the resulting product to the surrounding water and to the walls of the cup until disease germs have been destroyed and the water rendered safe for immediate drinking from the cup.

19. The process of purifying potable liquids, which consists in locally electrolyzing a suitable salt solution while it is surrounded by substantially non-conductive liquid to form sodium hypochlorite and immediately causing said hypochlorite to distribute itself and liberate oxygen in the nascent state throughout the body of the liquid under treatment and governing the extent of the electrolysis by the quantity of salt used.

20. The process of treating a cup of water to render it safe for drinking from the cup, which consists in placing therein a pair of suitable electrodes, introducing sodium chlorid into the water near the electrodes, but in quantity too small to render the surrounding body of water salty to the taste, passing current through the salted water to form hypochlorite, and allowing said hypochlorite to pass directly and immediately into all parts of the cup of water, and continuing the electrolysis until the water is purified of typhoid bacteria and the like and is fit to drink.

21. The process of treating a cup of water preparatory to drinking, so that it may be free from harmful disease germs and may be drunk directly from the cup in sterile and healthful condition without tasting salty, said process consisting in introducing into the cup from which the water is to be drunk a pair of suitable electrodes, rendering the body of water suitably conductive only in the immediate neighborhood of the electrodes by the addition of but a small quantity of an appropriate salt, passing an electrolyzing current between said electrodes to form hypochlorite, and circulating the hypochlorite through all parts of the water in such quantities as to purify the same and to sterilize the walls of the cup, so that the water even though it may initially have contained harmful disease germs may safely be drunk from the cup without further treatment.

In testimony whereof I affix my signature, in presence of two witnesses.

CHARLES F. BURGESS.

Witnesses:
C. B. SCHNIDER,
M. A. BILL.

Correction in Letters Patent No. 1,200,165.

It is hereby certified that in Letters Patent No. 1,200,165, granted October 3, 1916, upon the application of Charles F. Burgess, of Madison, Wisconsin, for an improvement in "Methods and Apparatus for Sterilizing," an error appears in the printed specification requiring correction as follows: Page 4, line 58, claim 1, after the word "terminals" insert the word *thereof;* and that the said Letters Patent should be read with this correction therein that the same may conform to the record of the case in the Patent Office.

Signed and sealed this 31st day of October, A. D., 1916.

[SEAL.]

Cl. 204—25.

R. F. WHITEHEAD,
*Acting Commissioner of Patents.*